United States Patent [19]

Bhat et al.

[11] 4,288,984
[45] Sep. 15, 1981

[54] NOISE SUPPRESSING TURBOFAN NOZZLES AND METHOD

[75] Inventors: Waman V. Bhat, Redmond; Charles P. Wright, Seattle, both of Wash.

[73] Assignee: The Boeing Company, Seattle, Wash.

[21] Appl. No.: 943,973

[22] Filed: Sep. 19, 1978

[51] Int. Cl.³ .......................... F02K 1/46; F02K 3/06
[52] U.S. Cl. .................................... 60/262; 60/226 R
[58] Field of Search ............... 60/262, 226 R, 226 A, 60/226 B, 224; 181/213, 220

[56] References Cited

U.S. PATENT DOCUMENTS

| | | | |
|---|---|---|---|
| 3,137,131 | 6/1964 | Tyler | 60/226 R |
| 3,174,282 | 3/1965 | Harrison | 181/220 |
| 3,174,282 | 3/1965 | Harrison . | |
| 3,393,518 | 7/1968 | Bridge | 60/226 R |
| 3,495,682 | 2/1970 | Treiber | 181/220 |
| 3,514,955 | 6/1970 | Paulson et al. | 60/262 |
| 3,527,317 | 9/1970 | Motsinger | 60/226 R |
| 3,583,640 | 6/1971 | MacDonald . | |
| 3,612,212 | 10/1971 | MacDonald . | |
| 3,618,701 | 11/1971 | MacDonald . | |
| 3,968,853 | 7/1976 | Hoch et al. . | |
| 4,135,363 | 1/1979 | Packman | 60/262 |

FOREIGN PATENT DOCUMENTS 955558  1/1957  Fed. Rep. of Germany ........ 60/262
1436412  6/1965  France .............................. 181/213

OTHER PUBLICATIONS

*McGraw-Hill Encyclopedia of Science & Technology*, vol. 1, p. 207.

*Primary Examiner*—Robert E. Garrett
*Attorney, Agent, or Firm*—Robert W. Beach; Ward Brown

[57] ABSTRACT

Noise perceived below a turbofan is reduced by providing a thicker fan flow below the turbofan primary exhaust flow than is present in conventional turbofans having generally circular and concentric fan and exhaust flows. To thicken the fan flow, the exhaust nozzle is offset upward in the fan nozzle, or the exhaust nozzle discharge end is canted to offset the exhaust flow upward, or the exhaust nozzle is flattened to a generally rectangular or an elliptical shape having a major horizontal axis. In any of these cases, the thickness of the fan flow below the primary exhaust flow is increased and less noise is perceived below the turbofan than if circular concentric fan and exhaust flows were produced. In one embodiment a noise-suppressing thickened fan flow is used in combination with a conventional noise-suppressing multilobe or multitube mixing nozzle to further reduce noise perceived below the turbofan.

17 Claims, 25 Drawing Figures

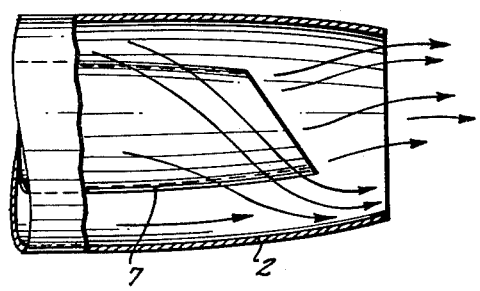
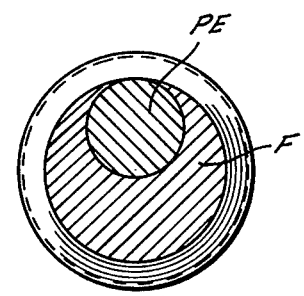
Fig.19.  Fig.20.
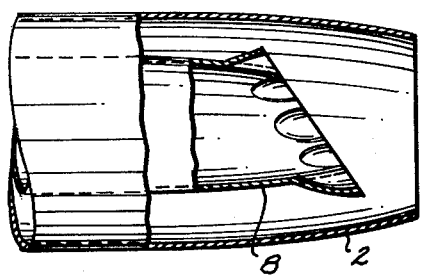
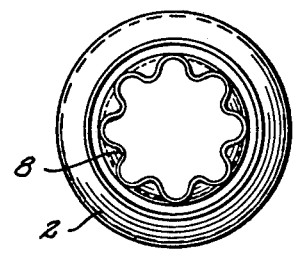
Fig.21.  Fig.22.
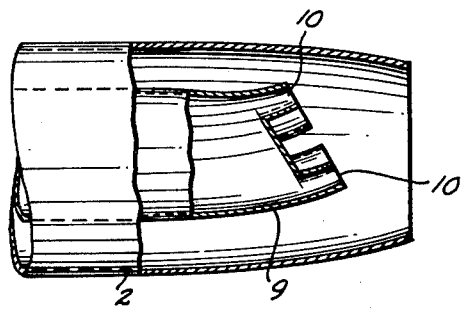
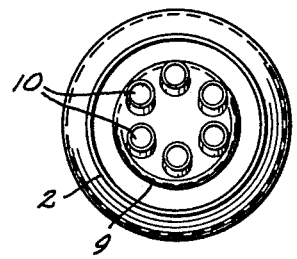
Fig.23.  Fig.24.

NOISE SUPPRESSING TURBOFAN NOZZLES AND METHOD

CROSS-REFERENCE

This application is related to U.S. application Ser. No. 037,381, filed May 8, 1979 in the name of Waman V. Bhat, for Noise-Suppressing Jet Engine Nozzles and Method.

BACKGROUND OF THE INVENTION

1. Field of the Invention

The present invention relates to noise-suppressing turbofan nozzles and methods.

2. Prior Art

A principal component of the noise produced by a jet engine is jet noise, that is, noise from the turbulent mixing of a high velocity stream of gas flowing from a gas discharge nozzle of the engine into the ambient atmosphere.

One way to promote rapid mixing of a discharge flow with ambient air is to provide a multitube discharge nozzle, such as the nozzle shown in FIGS. 1 and 2 of U.S. Pat. No. 3,612,212. Alternatively, a multilobe nozzle, such as the nozzle shown in FIG. 3 of that patent, can be provided. An asymmetrical, multilobe mixing nozzle is shown in FIGS. 1, 2 and 3 of U.S. Pat. No. 3,174,282. A nozzle having a notch to promote mixing is shown in U.S. Pat. No. 3,968,853.

Another way to promote mixing is to provide a deflector for directing ambient air toward the discharge flow. Such a deflector can be in the form of an annular "aspirator ring", as shown in U.S. Pat. No. 3,174,282, or in the form of swingable "doors", as shown in U.S. Pat. No. 3,583,640.

In a conventional turbofan, jet noise can be reduced by mixing the primary exhaust flow, that is, the stream of air flowing through the turbofan compressor, combustor and turbine, with the flow of air bypassing these parts through the fan duct. According to the *McGraw-Hill Encyclopedia of Science and Technology*, combining the primary exhaust and fan flows results in a jet noise reduction of from 5 to 10 dB (see Vol. 1, page 207). Further noise reduction can be accomplished by promoting rapid and complete mixing of the combined flow with the ambient atmosphere.

One problem with suppressing jet noise by mixing a high temperature, high velocity flow with ambient air or a cooler flow of lesser velocity is that mixing changes the noise spectrum or "signature" by decreasing low frequency noise and increasing high frequency noise. Since high frequency noise can be more objectionable than low frequency noise, the overall noise level may be reduced without a corresponding reduction in the number of complaints to the noise produced by a jet engine.

U.S. Pat. No. 3,618,701 discloses another method of jet noise suppression which includes ejecting a "gaseous shield" below a jet engine discharge flow. However, this method requires complicated additional mechanism adding to the weight of an aircraft without appreciably increasing thrust.

Yet another method of suppressing jet noise is disclosed in U.S. Pat. No. 3,393,518 in which the high temperature primary exhaust flow of a turbofan is discharged from the engine beneath at least the greater part of the stream of air which is passed through the fan, so that the noise in the stream of air tends to be refracted and/or reflected upwardly by the turbine exhaust gases.

See the abstract of U.S. Pat. No. 3,393,518. This patent is concerned with suppressing fan noise, whereas the present application is concerned with suppressing jet noise. As pointed out in U.S. Pat. No. 3,527,317, different methods must be used to suppress the different types of noise (see the paragraph beginning at column 1, line 47).

SUMMARY OF THE INVENTION

It is an object of the present invention to provide a method and apparatus for reducing jet noise perceived below a turbofan.

It is also an object to provide such apparatus and method in a form in which it may be incorporated easily into a conventional turbofan without requiring complicated, heavy or expensive additional parts.

The foregoing objects can be accomplished by thickening the turbofan fan flow below the turbofan primary exhaust flow.

In the disclosed embodiments, apparatus for thickening the fan flow includes a primary exhaust nozzle offset upward relative to the turbofan fan nozzle, or a primary exhaust nozzle flattened such that its horizontal dimension is greater than its vertical dimension, or a primary exhaust nozzle having a discharge end canted upward to offset the primary exhaust flow upward.

The primary exhaust nozzle may be a multilobe or multitube mixing nozzle to further reduce noise. In addition, the discharge end of the primary exhaust nozzle may be coplanar with the discharge end of the fan nozzle, or it may be retracted or projected.

BRIEF DESCRIPTION OF THE DRAWINGS

FIG. 19 is a side elevation of the discharge end portion of a turbofan improved in accordance with a further embodiment of the present invention with parts broken away, and FIG. 20 is a somewhat diagrammatic representation of the flows produced by the turbofan of FIG. 19.

FIG. 21 is a side elevation of the discharge end portion of a turbofan improved in accordance with still another embodiment of the present invention with parts broken away, and FIG. 22 is an end elevation of the turbofan of FIG. 21.

FIG. 23 is a side elevation of the discharge end portion of a turbofan modified in accordance with still another embodiment of the present invention with parts broken away, and FIG. 24 is an end elevation of the turbofan of FIG. 23.

DETAILED DESCRIPTION

As seen in FIGS. 1 through 6, in a conventional turbofan one flow of air, the "primary exhaust flow", passes through the turbofan compressor, combustor and turbine and is discharged from a generally circular primary exhaust nozzle 1. A separate flow of air, the "fan flow", bypasses the turbofan compressor, combustor and turbine and is discharged from a generally circular fan nozzle 2.

The primary exhaust nozzle is concentric within the fan nozzle and, accordingly, concentric primary exhaust and fan flows are produced. The primary exhaust flow is a high-temperature, high-velocity flow of generally circular cross section. The fan flow is of annular cross section, encircling the primary exhaust flow, and of less velocity and temperature.

Figure 1:
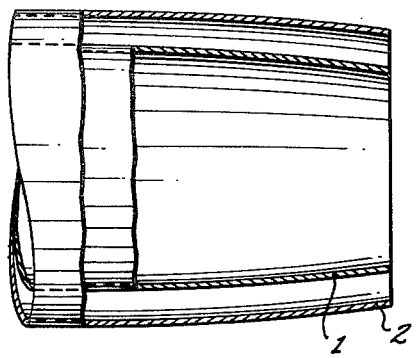
FIG. 1 is a side elevation of the discharge end portion of a conventional turbofan with parts broken away.
Figure 2:
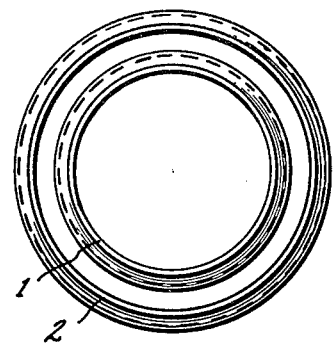
FIG. 2 is an end elevation of the turbofan of FIG. 1.
Figure 3:
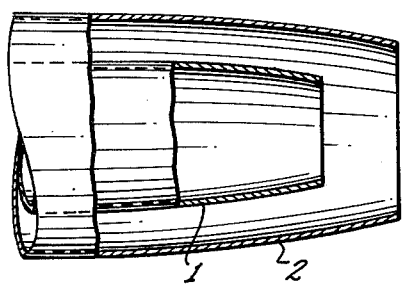
FIG. 3 is a side elevation of the discharge end portion of another type of conventional turbofan with parts broken away.
Figure 4:
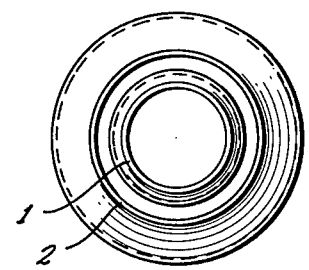
FIG. 4 is an end elevation of the turbofan of FIG. 3.
Figure 5:
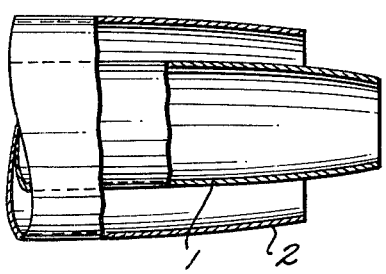
FIG. 5 is a side elevation of the discharge end portion of yet another type of conventional turbofan with parts broken away.
Figure 6:
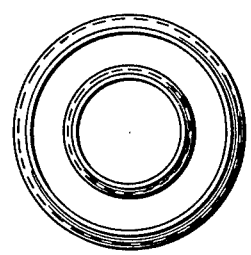
FIG. 6 is an end elevation of the turbofan of FIG. 5.

As best seen in FIG. 1, the discharge end of the exhaust nozzle can be coplanar with the discharge end of the fan nozzle. Alternatively, as shown in FIG. 3, the exhaust nozzle can be "retracted", that is, have its discharge end located forward of the discharge end of the fan nozzle. As best seen in FIG. 5, another alternative is to provide a "projected" exhaust nozzle, that is, an exhaust nozzle having its discharge end aft of the discharge end of the fan nozzle. Projection or retraction of the primary exhaust nozzle has only a slight effect on the noise produced by the turbofan.

In a representative conventional turbofan, the discharge ends of both the exhaust nozzle and the fan nozzle are perpendicular to the longitudinal axis of the turbofan.

In accordance with the present invention, noise perceived below a turbofan is reduced by "thickening" the lesser velocity fan flow below the higher velocity primary exhaust flow. As used herein, "thickening" means increasing the upright dimension of the fan flow below the primary exhaust flow. In the preferred embodiment of the invention, a substantially greater portion of the fan flow is disposed below the primary exhaust flow than above it, as diagrammmatically represented in FIGS. 7 through 10.

Figure 7:
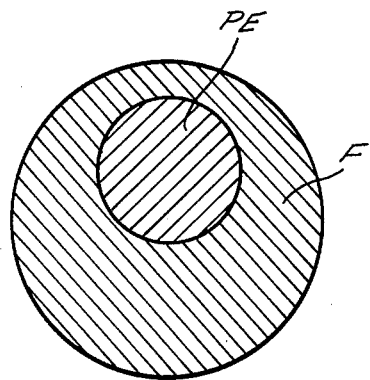
FIGS. 7, 8, 9 and 10 are diagrammatic representations of the primary exhaust and fan flows produced by the noise-suppressing apparatus and method of the present invention slightly downstream of the discharge nozzle of a turbofan, FIG. 7 showing the primary exhaust flow offset upward relative to the fan flow, FIG. 8 showing the primary exhaust flow offset slightly more upward in the fan flow so as to have its upper edge tangential with the upper edge of the fan flow, FIG. 9 showing the primary exhaust flow offset upward to an even greater degree so that part of the primary exhaust flow is above the fan flow, and FIG. 10 showing the primary exhaust flow offset to an even greater degree so that all of the primary exhaust flow is above the fan flow.
Figure 8:
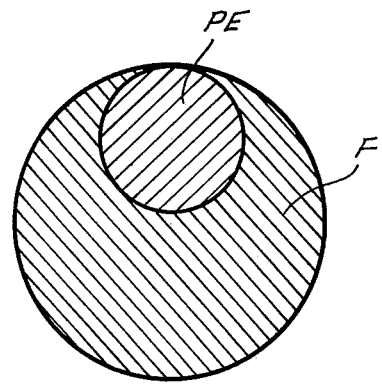
Figure 9:
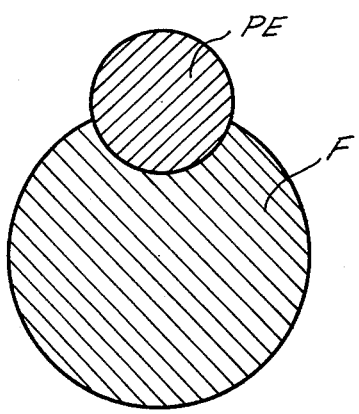
Figure 10:
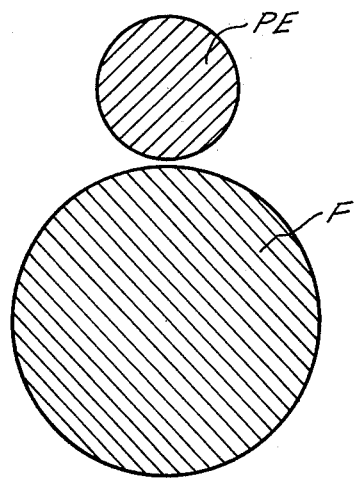

In FIG. 7, the primary exhaust flow PE is offset upward relative to the fan flow F. All of the exhaust flow is contained within the fan flow. In the noise-suppressing flows in accordance with the present invention represented in FIG. 8, the primary exhaust flow PE is offset upward relative to the fan flow F slightly more than the exhaust flow of FIG. 7, such that the upper edge of the primary exhaust flow is tangential to the upper edge of the fan flow. The general flow pattern of FIG. 8 is preferred. In the noise-suppressing flows of FIG. 9, the primary exhaust flow PE is offset even further upward such that a portion of the primary exhaust flow is outside of the fan flow. In the noise-suppressing flows of FIG. 10, all of the primary exhaust flow is above the fan flow.

In each of the embodiments of FIGS. 7 through 10, the upright dimension or "thickness" of the fan flow directly below the primary exhaust flow is greater than if circular and concentric flows were produced.

Provision of any of the flow patterns shown in FIGS. 7 through 10 results in a reduction in the noise level perceived below the turbofan. Why perceived noise is reduced by the relative arrangement of primary exhaust flow and fan flow discussed above is not clearly understood, because the exact causes of the noise produced by any jet aircraft engine, and particularly the causes of the noise produced by a turbofan, have not been determined precisely. It is believed that such flow relationship produces a certain amount of noise elimination, and that such elimination is attributable to the fact that at least a portion of the primary exhaust flow is closer to the ambient atmosphere than such portion would be with concentric flows, so that more rapid mixing of the primary exhaust flow with the ambient atmosphere occurs. In addition, it is believed that the jet noise produced by the high velocity, high temperature primary exhaust flow is radiated downward to a lesser extent than in other directions because of reflection or scattering of sound waves by the thickened lesser velocity fan flow.

Another possible explanation is that core noise, that is noise produced by the turbofan compressor, combustor and turbine, is radiated more through the primary exhaust flow than through the fan flow and, because of reflection or scattering, is radiated to a lesser extent downward than in other directions. Similarly, a certain amount of fan tones or fan noise may be radiated through the exhaust nozzle of the turbofan and scattered or reflected. At any rate, the noise perceived below the turbofan is reduced significantly by thickening the fan flow.

Figure 11:
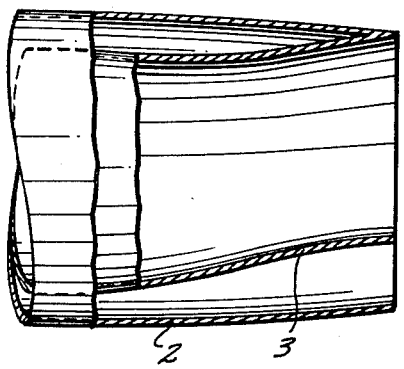
FIG. 11 is a side elevation of the discharge end portion of a turbofan improved in accordance with the present invention with parts broken away.
Figure 12:
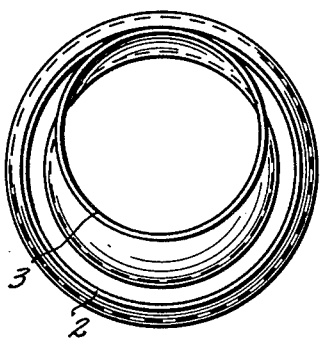
FIG. 12 is an end elevation of the turbofan of FIG. 11.

Conventional turbofan nozzles can be modified easily to produce a noise-suppressing thickened fan flow in accordance with the presnt invention. As shown in FIGS. 11 and 12, the portion of a primary exhaust nozzle 3 located a substantial distance forward of its discharge end can be circular and concentric within a conventional fan nozzle 2. The portion of exhaust nozzle 3 adjacent to its discharge end can be swept upward so that the upper edge of the discharge end of the exhaust nozzle is tangential to the upper edge of the fan nozzle.

Figure 13:
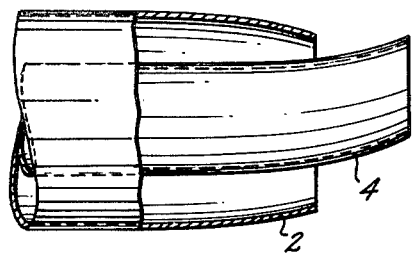
FIG. 13 is a side elevation of the discharge end portion of a turbofan improved in accordance with an alternative embodiment of the present invention with parts broken away.
Figure 14:
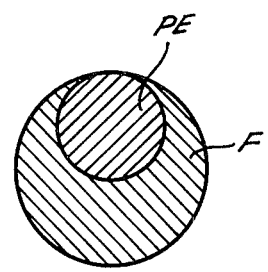
FIG. 14 is a diagrammatic representation of the flows produced by the turbofan of FIGS. 11 and 12 or the turbofan of FIG. 13.

In the embodiment of FIGS. 11 and 12, the discharge ends of the exhaust and fan nozzles are coplanar. However, as shown in FIGS. 13 and 14, the same type of modification can be provided for a turbofan having a projected exhaust nozzle 4 by sweeping only the exhaust nozzle projecting portion upward. As shown in FIG. 14, the flow pattern of each of these embodiments corresponds to the preferred flow pattern shown in FIG. 8 in that both the primary exhaust flow and the fan flow are circular and the exhaust flow is offset upward relative to the fan flow with its upper edge tangential to the upper edge of the fan flow. These two embodiments of the present invention are preferred because only a slight modification of conventional structure is required. In addition, in neither embodiment is it necessary to alter the cross-sectional area or shape of the exhaust nozzle so performance of the turbofan is affected only minimally.

Figure 15:
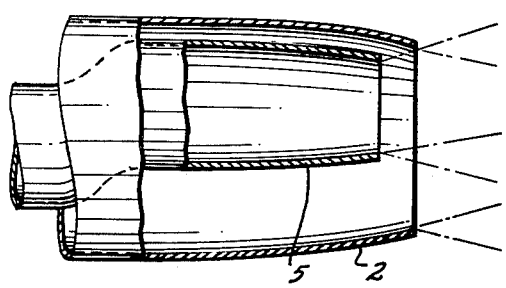
FIG. 15 is a side elevation of a turbofan improved in accordance with yet another embodiment of the present invention with parts broken away.
Figure 16:
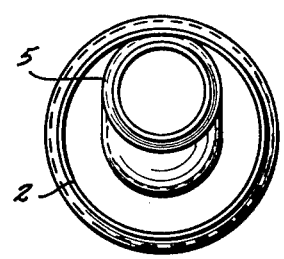
FIG. 16 is an end elevation of the turbofan of FIG. 15.

In the embodiment of FIGS. 15 and 16, almost the entire primary exhaust nozzle 5 is offset upward relative to a conventional fan nozzle 2. The flow pattern produced by the embodiment of FIGS. 15 and 16 generally corresponds to the flow pattern of FIG. 7.

In the embodiment shown in FIGS. 17 and 18, the fan flow is thickened below the primary exhaust flow without offsetting the primary exhaust nozzle relative to the fan nozzle. As in the embodiment of FIGS. 11 and 12, the portion of a primary exhaust nozzle 6 a substantial distance upstream of its discharge end is circular and concentric within a conventional fan nozzle 2. The upper and lower portions of the primary exhaust nozzle converge gradually rearward to form a discharge end which is flattened in that its horizontal dimension is substantially greater than its vertical dimension. Consequently, the thickness of the fan flow below the primary exhaust flow is substantially greater than if a conventional primary exhaust nozzle having the same cross-sectional area were located concentrically within the fan nozzle. In addition, much less of the fan flow passes laterally of the primary exhaust nozzle than in a conventional turbofan so the lateral portions of the exhaust flow mix rapidly with the ambient atmosphere.

Figure 17:
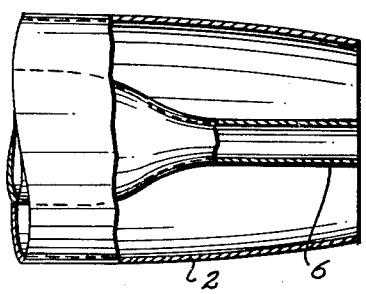
FIG. 17 is a side elevation of the discharge end portion of a turbofan improved in accordance with still another embodiment of the present invention with parts broken away.
Figure 18:
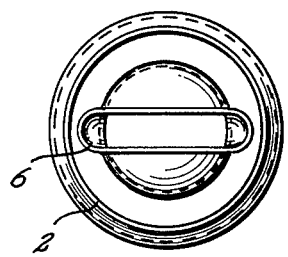
FIG. 18 is an end elevation of the turbofan of FIG. 17.

In the embodiment of FIGS. 17 and 18, the discharge ends of the primary exhaust nozzle and the fan nozzle are coplanar, but the primary exhaust nozzle could be either retracted or projected with little effect on the noise produced by the turbofan. The fan flow could be thickened even more by offsetting the flattened discharge end of the primary exhaust nozzle upward.

FIGS. 19 and 20 show another embodiment of the present invention in which a noise-suppressing thickened fan flow is provided without offsetting the primary exhaust nozzle. While primary exhaust nozzle 7 is retracted and generally circular and concentric within a conventional fan nozzle 2, the discharge end of the primary exhaust nozzle is canted so that, as indicated by the arrows in FIG. 19, the primary exhaust flow is directed upward as it leaves the primary exhaust nozzle and substantially more of the fan flow is expelled below the primary exhaust flow than if the discharge end of the primary exhaust nozzle were perpendicular to the longitudinal axis of the primary exhaust and fan nozzles. As diagrammatically shown in FIG. 20, in the embodiment of FIG. 19 the flow pattern at the discharge end of the fan nozzle generally corresponds to the flow pattern of FIG. 8. A different cant angle could be used to produce a different flow pattern. The embodiment of FIGS. 21 and 22 is a modification of the embodiment of FIGS. 19 and 20. The forward portion of a multilobe mixing nozzle 8 is generally circular and concentric within a conventional fan nozzle 2, and the discharge end of primary exhaust nozzle 8 is canted to direct the primary exhaust flow upward. Because of the cant, a noise-suppressing thickened fan flow is produced. Noise is further reduced because beyond the discharge end of the fan nozzle the primary exhaust flow is mixed rapidly with ambient air and the fan flow because of the action of the nozzle lobes.

FIGS. 23 and 24 show a further modification in which a multitube mixing primary exhaust nozzle 9 is used. The major portion of such nozzle is generally circular and concentric within a conventional fan nozzle 2. However, each discharge tube 10 of such primary exhaust nozzle is swept upward to direct the portion of the primary exhaust flow passing through such tube upward. The discharge ends of tubes 10 are coplanar, and the plane defined by the discharge ends is inclined relative to the longitudinal axis of the fan nozzle.

The various embodiments for thickening the fan flow shown in the drawings should not be considered exclusive of each other. For example, the discharge end of a primary exhaust nozzle could be both canted and offset upward relative to a fan nozzle; or canted and flattened; or canted, offset upward and flattened. In addition, various types of multilobe or multitube mixing nozzles can be used to further reduce noise. A primary exhaust nozzle in accordance with the present invention can be in position retracted ahead or projected beyond the end of the fan nozzle as may be preferred.

Although each embodiment for producing a noise-suppressing thickened fan flow shown in the drawings includes a modified primary exhaust nozzle, a thickened fan flow could be provided by using a conventional primary exhaust nozzle and a modified fan nozzle. For example, instead of flattening the primary exhaust nozzle as shown in FIGS. 17 and 18, a fan nozzle could be flattened such that its vertical dimension is substantially greater than its horizontal dimension. Similarly, rather than canting the primary exhaust nozzle to offset the primary exhaust flow upward, the fan nozzle could be canted to offset the fan flow downward. Any combination of primary exhaust nozzle modification and fan nozzle modification which will provide a thickened fan flow below the primary exhaust flow could be used.

A series of comparative tests were conducted to determine the amount of noise reduction made possible by the present invention. In one set of tests the engine exhaust model was provided with conventional, circular, concentric nozzles having coplanar discharge ends perpendicular to the longitudinal axis of the engine as shown in FIG. 1. In a second set of tests, the engine exhaust model was provided with a primary exhaust nozzle modified along the lines of the embodiment of FIGS. 11 and 12, that is, the portion of the primary exhaust nozzle a substantial distance upstream of its discharge end was circular and concentric within the fan nozzle, but the portion adjacent to its discharge end was swept upward so that its upper edge was tangential to the upper edge of the discharge end of the fan nozzle. For comparison, in a third set of tests, a primary exhaust nozzle modified along the lines shown in FIG. 2 of U.S. Pat. No. 3,393,518 was provided in that the portion of the primary exhaust nozzle adjacent to its discharge end was swept downward so that the primary exhaust flow was discharged below the fan flow.

Figure 25:
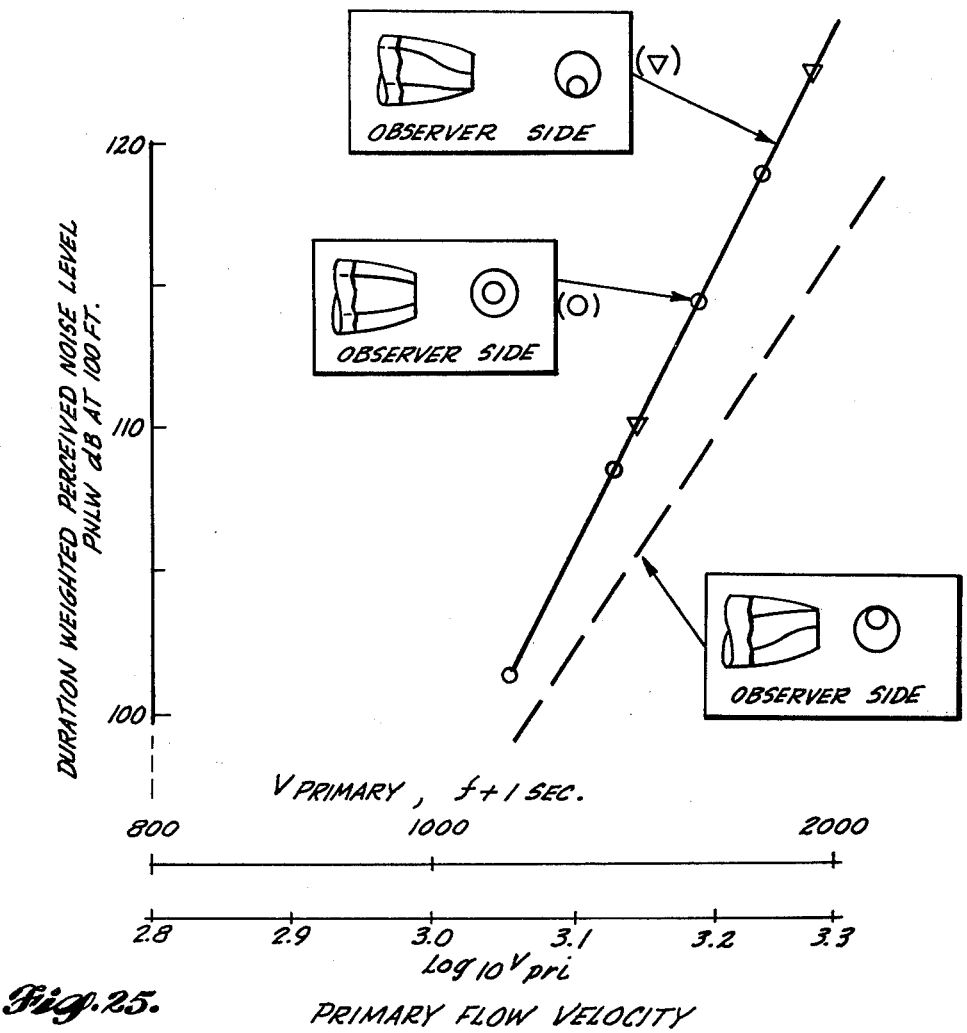
FIG. 25 is a graphic representation of the noise reduction achieved by one embodiment of the present invention as compared with the noise produced by one form of a conventional turbofan having circular concentric discharge nozzles and one form of a turbofan modified in accordance with U.S. Pat. No. 3,393,518.

In each set of tests, the noise levels at various points in the vertical plane containing the longitudinal axis of the fan nozzle were measured. The results of the tests are shown in FIG. 25 in which the "duration weighted perceived noise level" (PNLW) is shown as a function of the velocity of the primary exhaust flow. PNLW is defined as:

$$PNLW = 10 \, \text{Log}_{10} \sum_{\theta=100°}^{150°} \left[ 10 \frac{(PNL(\theta) - 10 \, \text{Log} \, \text{Sin}^2 \theta)}{10} \right]$$

Where:
PNL = the perceived noise level in PNdB units; and
$\theta$ = the angle between the longitudinal axis extending forward from the fan nozzle and the line connecting the observation point and the center of the fan nozzle inlet.

The summation for $\theta$ angles between 100° and 150° was approximated by summing for $\theta$ angles in 10° increments.

As shown in FIG. 25, the tests revealed that modifying an exhaust nozzle in accordance with U.S. Pat. No. 3,393,518 results in no appreciable noise reduction, as measured in PNLW, over a turbofan exhaust model having conventional primary exhaust and fan nozzles. However, a substantial reduction is effected by modifying a primary exhaust nozzle in accordance with the present invention. For example, a representative primary exhaust flow velocity for a Pratt & Whitney JT8D engine at takeoff is 1,900 feet per second. At this exhaust velocity, the noise observed below the JT8D as measured in PNLW would be about 6 dB less than the noise measured below a JT8D having conventional nozzles.

We claim:

1. In a turbofan including a primary exhaust nozzle, core means for producing a primary exhaust flow through the primary exhaust nozzle, a fan nozzle encircling the primary exhaust nozzle such that the primary exhaust nozzle, at a location forward of its discharge end, is generally circular and concentric within the fan nozzle, and fan means for producing a fan flow through the fan nozzle, the velocity of the primary exhaust flow produced by the core means being greater than the velocity of the fan flow produced by the fan means, the improvement comprising the fan nozzle and the primary exhaust nozzle being constructed and arranged relatively so that at the discharge end of the rearmost nozzle the upright thickness of the fan flow below the primary exhaust flow is greater than the lateral thickness of the fan flow at a location laterally of the primary exhaust flow for suppressing jet noise perceived below the turbofan.

2. In the turbofan defined in claim 1, the discharge end of the primary exhaust nozzle being offset upward relative to the discharge end of the fan nozzle to effect the greater thickness of fan flow below the primary exhaust flow.

3. In the turbofan defined in claim 2, the primary exhaust nozzle including a portion projecting aft of the discharge end of the fan nozzle, and the primary exhaust nozzle projecting portion being curved upward.

4. In the turbofan defined in claim 1, the primary exhaust nozzle being within the fan nozzle and the discharge end of the primary exhaust nozzle being flattened such that its horizontal dimension is greater than its vertical dimension to effect the greater thickness of fan flow below the primary exhaust flow.

5. In the turbofan defined in claim 1, the discharge end of the primary exhaust nozzle being canted to offset the primary exhaust flow upward to effect the greater thickness of fan flow below the primary exhaust flow.

6. In the turbofan defined in claim 5, the discharge end of the primary exhaust nozzle being located forward of the discharge end of the fan nozzle.

7. In a turbofan including a primary exhaust nozzle, core means for producing a primary exhaust flow through the primary exhaust nozzle, a fan nozzle encircling the primary exhaust nozzle and fan means for producing a fan flow through the fan nozzle, the velocity of the primary exhaust flow produced by the core means being greater than the velocity of the fan flow produced by the fan means, the improvement comprising the fan nozzle and the primary exhaust nozzle being constructed and arranged relatively so that at the discharge end of the rearmost nozzle the upright thickness of the fan flow below the primary exhaust flow is greater than the lateral thickness of the fan flow at a location laterally of the primary exhaust flow for suppressing jet noise perceived below the turbofan, the discharge end of the primary exhaust nozzle being canted to offset the primary exhaust flow upward to effect the greater thickness of fan flow below the primary exhaust flow.

8. In the turbofan defined in claim 1 or 7, the primary exhaust nozzle being a multilobe mixing nozzle.

9. In the turbofan defined in claim 1, the primary exhaust nozzle being a multitube mixing nozzle.

10. In the turbofan defined in claim 9, the tubes of the multitube mixing nozzle being inclined upward toward their discharge ends to effect the greater thickness of fan flow below the primary exhaust flow.

11. In a turbofan including means for producing a high velocity discharge gas flow and means for producing a separate lesser velocity discharge gas flow, said two flow-producing means including separate gas discharge nozzles having respective portions of generally circular cross-section which portions are generally concentric at a location forward of the discharge ends of such nozzles, the improvement comprising the two flow-producing means including means for disposing at least the major portion of the lesser velocity gas flow discharged from the turbofan below at least the major portion of the high velocity gas flow discharged from the turbofan for suppressing jet noise perceived below the turbofan.

12. In a turbofan including a primary exhaust nozzle, core means for producing a primary exhaust flow through the primary exhaust nozzle, a fan nozzle encircling the primary exhaust nozzle and fan means for producing a fan flow through the fan nozzle, the velocity of the primary exhaust flow produced by the core means being greater than the velocity of the fan flow produced by the fan means, the improvement comprising the fan nozzle and the primary exhaust nozzle being constructed and arranged relatively so that at the discharge end of the rearmost nozzle the upright thickness of the fan flow below the primary exhaust flow is greater than the lateral thickness of the fan flow at a location laterally of the primary exhaust flow for suppressing jet noise perceived below the turbofan, the primary exhaust nozzle being a multitube mixing nozzle and the tubes of said multitube mixing nozzle being inclined upward toward their discharge ends to effect the greater thickness of fan flow below the primary exhaust flow.

13. In the turbofan defined in claim 10 or 12, the discharge ends of the tubes of the multitube mixing nozzle being coplanar, and the plane of the tube discharge ends being canted relative to the longitudinal axis of the turbofan.

14. In the turbofan defined in claim 1, the discharge end portion of the primary exhaust nozzle being deflected upward relative to the discharge end portion of the fan nozzle to effect the greater thickness of fan flow below the primary exhaust flow.

15. In the turbofan defined in claim 1, 14, 7 or 12, the fan nozzle and the primary exhaust nozzle being constructed and arranged relatively so that more of the fan flow is discharged below the primary exhaust flow than above the primary exhaust flow.

16. In a turbofan including a primary exhaust nozzle, core means for producing a primary exhaust flow through the primary exhaust nozzle, a fan nozzle encircling the primary exhaust nozzle and fan means for producing a fan flow through the fan nozzle, the velocity of the primary exhaust flow produced by the core means being greater than the velocity of the fan flow produced by the fan means, the improvement comprising the discharge end portion of the primary exhaust nozzle being deflected upward relative to the discharge end portion of the fan nozzle so that more of the fan flow is discharged below the primary exhaust flow than above the primary exhaust flow for suppressing jet noise perceived below the turbofan.

17. In a turbofan including a primary exhaust nozzle, core means for producing a primary exhaust flow through the primary exhaust nozzle, a fan nozzle encircling the primary exhaust nozzle and fan means for producing a fan flow through the fan nozzle, the velocity of the primary exhaust flow produced by the core means being greater than the velocity of the fan flow produced by the fan means, the improvement comprising the fan nozzle and the primary exhaust nozzle being constructed and arranged relatively so that at the discharge end of the rearmost nozzle the upright thickness of the fan flow below the primary exhaust flow is greater than the lateral thickness of the fan flow at a location laterally of the primary exhaust flow for suppressing jet noise perceived below the turbofan, the discharge end of the primary exhaust nozzle being flattened such that its horizontal dimension is greater than its vertical dimension to effect the greater thickness of fan flow below the primary exhaust flow.

* * * * *

UNITED STATES PATENT AND TRADEMARK OFFICE
CERTIFICATE OF CORRECTION

PATENT NO. : 4,288,984
DATED : September 15, 1981
INVENTOR(S) : Waman V. Bhat and Charles P. Wright It is certified that error appears in the above-identified patent and that said Letters Patent are hereby corrected as shown below:

Column 7, lines 13 and 14, the portion of the equation between the square brackets should read as follows:

$$10^x, \text{ where } x = \frac{(PNL(\theta) - 10 \text{ Log Sin}^2\theta)}{10}$$

Signed and Sealed this

Nineteenth Day of January 1982

[SEAL]

Attest:

GERALD J. MOSSINGHOFF

Attesting Officer     Commissioner of Patents and Trademarks